Sept. 24, 1963

R. E. SKRONEK ET AL 3,104,471

APPARATUS FOR GAUGING PROFILES

Filed May 1, 1961

INVENTORS
Robert E. Skronek,
BY Charles D. Tuttle, &
Charles H. Mellan

Bruce G. Klaas
ATTORNEY

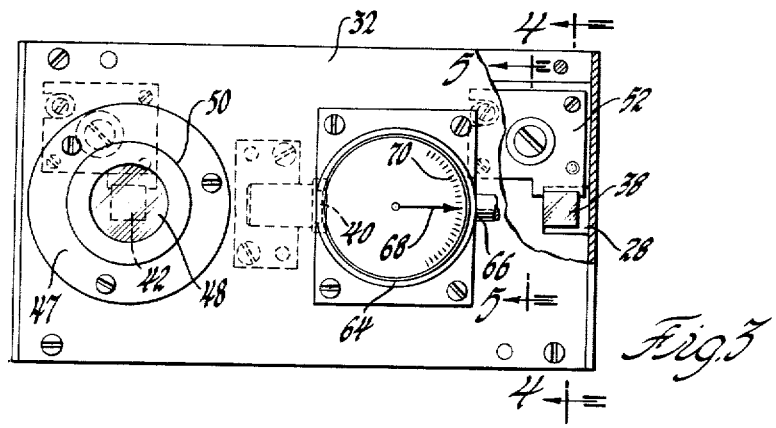
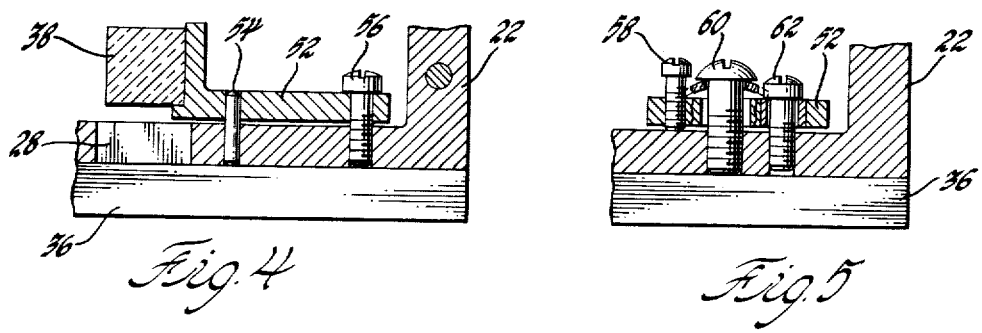
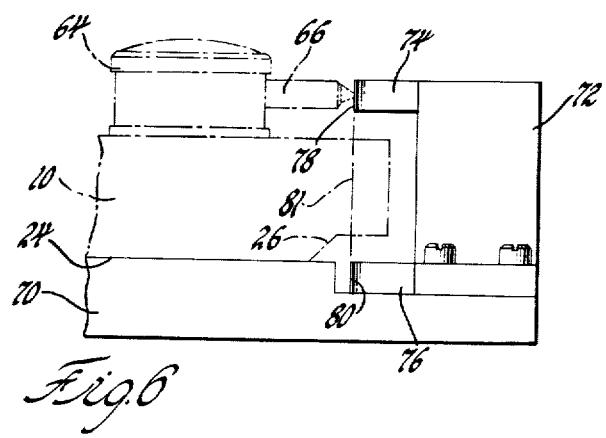

3,104,471
Patented Sept. 24, 1963

1

3,104,471
APPARATUS FOR GAUGING PROFILES
Robert E. Skronek, Detroit, and Charles D. Tuttle, Wyandotte, Mich., and Charles H. Mellan, Windsor, Ontario, Canada, assignors to General Motors Corporation, Detroit, Mich., a corporation of Delaware
Filed May 1, 1961, Ser. No. 106,686
4 Claims. (Cl. 33—174)

This invention relates to a method of comparing the outline of a workpiece to a master outline and to apparatus for effectuating the method.

An object of this invention is to provide a new and improved method of checking the dimensional accuracy of a workpiece. Another object of this invention is to provide new and improved apparatus for checking the dimensional accuracy of a workpiece relative to an exactly dimensioned duplicate device. Still another object of this invention is to provide apparatus for measuring dimensional differences between the profile of a workpiece and a master profile of exact dimensions and proportions. A further object of this invention is to provide apparatus and a method for comparing dimensional differences between a workpiece and exactly dimensioned comparison means by direct measurements with a dial-type indicator.

In the present invention, apparatus is provided for measuring dimensional variations in the profile of a workpiece by comparison with master profile means and comprises: supporting means to support a workpiece in spaced parallel relationship relative to a master profile means with two spaced points on the periphery of the workpiece aligned with corresponding spaced points on the periphery of the master profile means, movable means for movement about the periphery of the workpiece to random positions along a predetermined line located parallel to and equally spaced from the master profile means, locating means associated with the movable means to randomly locate the movable means in a fixed relation relative to the predetermined line at a plurality of points around the periphery of the workpiece which are located on the predetermined line and are equally spaced from and located parallel to the master profile means, and measuring means to measure variations in the distance between the workpiece and the predetermined line as the movable means is located at the varying positions.

The novel features of this invention are hereinafter described in detail by reference to the accompanying drawing wherein:

FIGURE 3 is a top view of the apparatus shown in FIGURE 2;

FIGURE 4 is a partial sectional view taken along the line 4—4 in FIGURE 3;

FIGURE 5 is a partial sectional view taken along the line 5—5 in FIGURE 3; and

FIGURE 6 is a partial side elevational view of a master gauge calibrating fixture for use with the apparatus shown in FIGURE 1.

Figure 1:
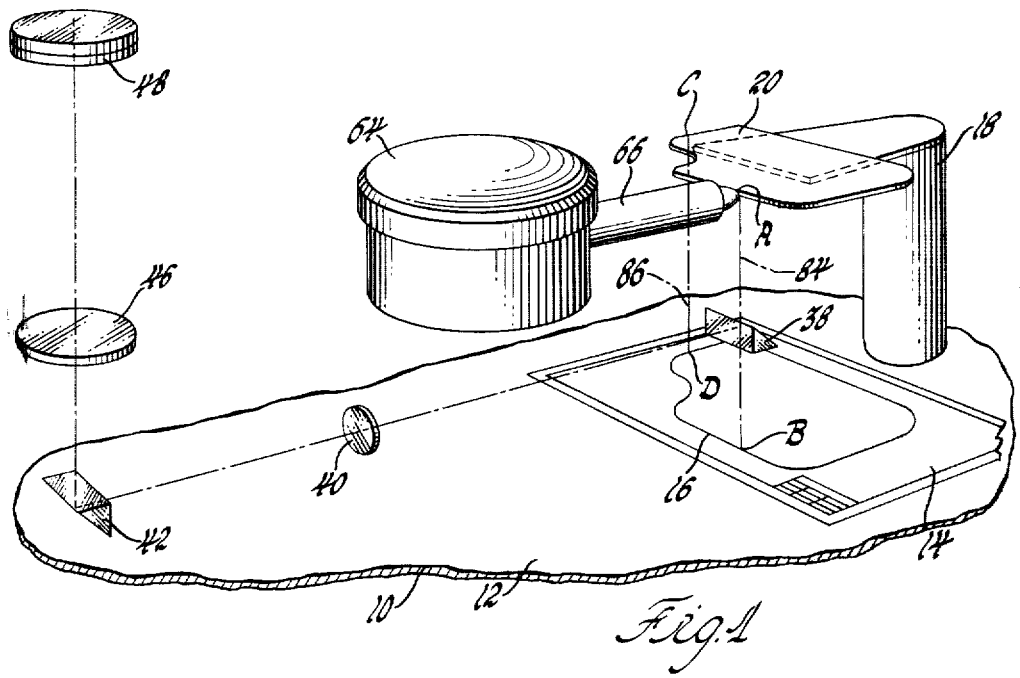
FIGURE 1 is a partial perspective diagrammatic view of apparatus embodying the present invention.
Figure 2:
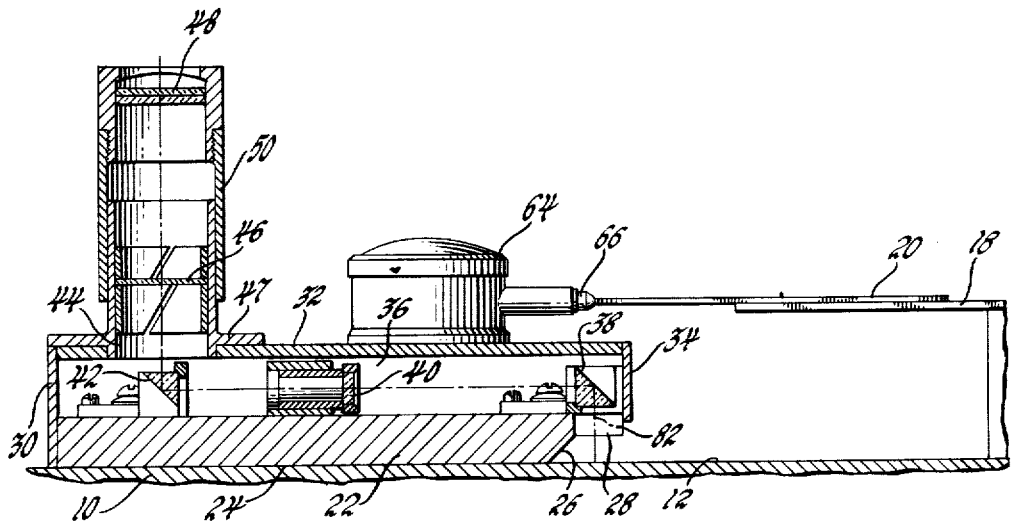
FIGURE 2 is a side elevational view of apparatus embodying the present invention.

Referring now to FIGURES 1, 2 and 3, an inspection table 10 having a precision ground upper surface 12 supports master profile means such as a drawing 14, having an outline 16 of a template-type workpiece traced thereon. Support means for a workpiece comprising a bracket 18 may be associated with the table in any suitable manner and a template-type workpiece 20 is illustrated in supported engagement with the bracket 18 in a position parallel to the upper surface 12 of the work table and

2 parallel to the master profile means 14. The workpiece 20 may be flexably secured in any suitable manner, such as by the use of clamps, magnetism or the like.

Movable means comprising a slide block 22 having a precision ground flat bottom surface 24 is slidably supported on the upper surface of the work table and includes an inwardly recessed portion 26 at one end thereof which underlies a viewing port 28 extending vertically through the upper surface of the slide block. Housing and support means are provided on the block 22 by a plurality of plates 30, 32, 34 which enclose the upper surface of the slide block 22 and define a viewing chamber 36. An optical system is provided in the viewing chamber to enable the outline 16 on the master profile means 14 to be viewed through the hole 28. The system comprises a prism 38 which is vertically aligned over the viewing port 28, an achromatic color corrected lens 40, another prism 42 which is vertically aligned with a viewing port 44 in the upper plate 32, a reticle 46 supported in a hub 47, and an eyepiece 48 supported within an adjustable housing 50 concentrically mounted about the hub 47. The optical system comprises conventional apparatus and need not be described in any further detail. As shown in FIGURES 4 and 5, the prism 38 is mounted on a support plate 52 which is adjustably mounted by a pin 54 and bolts 56, 58, 60, 62 to the top surface of the slide 22. The prism 42 and the lens 40 are similarly adjustably mounted to provide means for aligning the optical system.

A conventional dial-type indicating gauge 64 is fixed to the top of the plate 32 and includes a reciprocably mounted probe 66 which actuates an indicator 68 associated with indicia 70 on the face of the gauge in a well known manner. In order to calibrate the gauge 64 relative to the optical system, a master fixture is provided as shown in FIGURE 6. The master fixture comprises a support table 70 and a bracket 72 having upper and lower spaced parallel plates 74, 76. The end surfaces 78, 80 of the upper and lower plates are vertically aligned along the center line 81. In addition, the plates 74, 76 are parallelly aligned with the upper surface of the table 70 and the lower surface 24 of the slide block 10.

In operation, the gauging of a workpiece 20 to determine the similarity of its periphery or profile relative to a master profile means is accomplished by first calibrating the gauge 64. Accordingly, the slide block 10 is positioned on the upper surface of the table 70 and the cross hair or other marking on the reticle 46 is aligned with the center line 81 by aligning the cross hair with the vertical surface 80 so that the gauging instrument is located as shown in FIGURE 6. Since the upper plate 74 is parallel to the lower plate 76 and the end surface 78 is vertically aligned with the end surface 80, the tip of the probe 66 will also be vertically aligned with the reticle marking in the optical system. At this time, the gauge 64 may be calibrated to the central position shown in FIGURE 3 which represents a neutral or zero reading.

Next, the measuring instrument is returned to the top surface of the table 10 on which the slide block 22 is parallelly supported so that the reticle marking center line 82 is perpendicular to the surface 12 and vertically aligned with the end of the probe 66 in the zero position of the gauge indicator 68. A drawing or a reference template or other master profile means 14 is mounted on the table 10 in parallel alignment therewith. A workpiece 20 to be measured relative to the master profile 16 is positioned on the support bracket 18 in parallel alignment with the top surface 12 of the table and parallel to the master profile means 14. In order to position the workpiece in a corresponding manner relative to the profile outline 16, the slide means 22 is positioned so that the viewing port 28 extends over the outline 16. When the marking on the reticle indicates that the center line 82 is vertically aligned with the outline 16, the workpiece 20 is positioned against the movable probe 66 until the indicator 68 is moved to its zero or neutral position. In this manner, a point A on the workpiece 20 and a corresponding point B on the outline 16 are vertically aligned as indicated by the center line 84 in FIGURE 1. Next, the gauging instrument is moved to another point C on the periphery of the workpiece 20 and the center line 82 is aligned with a point D on the outline 16. When the workpiece 20 is positioned so that the indicator 68 is in the zero or neutral position, the points C and D will be vertically aligned as indicated by the center line 86 in FIGURE 1. When at least two spaced points on the periphery of the workpiece 20 are vertically aligned with corresponding spaced points on the outline 16, the workpiece 20 will have been correspondingly positioned relative to the outline 16 so that dimensional variations therebetween can be measured. At this time, the slide means 22 may be moved around the outline 16 to a plurality of positions to randomly check peripheral variations of the workpiece 20 at any points therearound. At each point to be checked, the center line 82, which is indicated by the marking on the reticle 46, is vertically aligned with the outline 16. Variations in the vertical alignment of the corresponding portion of the workpiece 20 are reflected by inward or outward movement of the probe 66 relative to its neutral or zero position. The indicator 68 will move about its pivot to one side or the other of the neutral position to indicate the amount of variation of the position of the workpiece 20 from its desired position. The accuracy of the workpiece is thus determined by moving the measuring instrument to various positions around the periphery of the master profile means 14 and aligning the cross hair of the optical system with a point on the outline to be measured. The reading on gauge 64 is an indication of the deviation of the corresponding point on the workpiece 20 from the theoretical position as shown on the master profile means.

In this manner, a new method of comparing the profile of a workpiece to a master profile has been disclosed which comprises the steps: of positioning the workpiece in parallel spaced relation to the master profile, aligning at least two spaced points on the periphery of the workpiece with corresponding spaced points on the periphery of the master profile so that lines drawn between each of the spaced points on the periphery of the workpiece and the corresponding spaced points on the periphery of the master profile are parallel to one another and perpendicular to the workpiece and to the master profile, engaging a probe with the periphery of the workpiece at one of the spaced points thereon, calibrating a gauge means operably connected to the probe means to a neutral measuring position when the probe is engaged at the one point, causing relative movement between the probe and the workpiece around the periphery of the workpiece, engaging the probe with the periphery of the workpiece during movement therearound, and maintaining the gauge at a fixed relative distance from the periphery of the master profile as the probe is engaged about the periphery of the workpiece so that variations in positional location of corresponding points on the workpiece periphery and the master profile will be reflected by variations in the distance between the gauge means and the periphery of the workpiece relative to the distance between the gauge means and the periphery of the workpiece at the one point and indicated on the gauge means by the movement of the probe means relative thereto.

Obvious changes in the details of construction of the apparatus and obvious modifications in the arrangement of the various parts which may be suggested by those skilled in the art are intended to be included within the scope of this invention as defined by the appended claims.

The invention claimed is:
1. Apparatus for determining tolerance variations in the contour of a workpiece, comprising a support having a supporting surface, master contour means mounted on said supporting surface, means locating said workpiece in spaced parallel alignment above said master contour means, a block having a bottom surface freely slidably supported on said supporting surface, an optical housing mounted on said block, a portion of said block being spaced above said bottom surface and extending outwardly therefrom a distance sufficient to permit portions of the master contour to be located thereunder, a first viewing port provided in said portion and opening into said housing, said housing defining a passage extending from said viewing port to a second spaced viewing port, eyepiece means mounted in said second viewing port, an optical system mounted in said passage to transmit images of said master contour means through said viewing port to said eyepiece means, dial gauge means carried by said block and having probe means engageable with said workpiece, a reticle in said optical system to provide a fixed reference point controllably located in said viewing port whereby points on said master contour means may be located in a predetermined position relative to said gauge means, and said probe means being movable outwardly and inwardly from a neutral position at said predetermined position by engagement with said workpiece above said fixed reference point whereby dimensional variations in the contour of said workpiece relative to said master contour means will be indicated on said dial gauge means according to the variation in position of said probe means relative to said neutral position.

2. Apparatus for measuring dimensional variations between the contour of a workpiece and the contour of a master profile piece comprising, means for supporting said workpiece in spaced relationship relative to said master profile piece with said contours thereof located in generally parallel relationship and at least two spaced points on the contour of said workpiece aligned with corresponding points on the contour of said master profile piece, means movable about the contour of one of said pieces and engageable therewith at selected test points thereon, optical reference and locating instrument means associated with said movable means in fixed dimensional reference relationship therewith, said instrument means being movable with said movable means so as to be positioned in viewing relation with respect to the contour of the other of said pieces at reference test points corresponding to said selected test points, means for referring and positioning said instrument means relative to said reference test points to locate said movable means in said fixed dimensional reference relationship relative to said reference test points, and means associated with said movable means for measuring dimensional variations between the contours of said pieces at the corresponding test points thereof.

3. Apparatus for measuring dimensional variations between the contour of a workpiece and the contour of a master profile piece comprising, means for supporting said workpiece in spaced relationship relative to said master profile piece with said contours thereof located in generally aligned parallel relationship, dimensional variation measuring means movable about the contour of one of said pieces and engageable therewith at selected test points thereon, optical reference and locating instrument means associated with said measuring means in fixed dimensional reference relationship therewith, said instrument means being movable with said measuring means so as to be positioned in viewing relation with respect to the contour of the other of said pieces at reference test points thereon corresponding to said selected test points, and means associated with said instrument means for optically referring and positioning said instrument means relative to said reference test points to locate said measuring means in said dimensional reference relationship relative to said reference test points so that dimensional variations in the contour of said pieces at said corresponding test points thereof from said generally aligned relationship therebetween will be reflected by said measuring means.

4. Apparatus for measuring dimensional variations between the contour of a workpiece and the contour of master profile means comprising, means for supporting said workpiece in spaced relationship relative to said master profile means with said contours thereof located in generally aligned parallel relationship, gauge means movable about the contour of said workpiece, probe means carried by said gauge means and reciprocably movable with respect thereto from a calibrated neutral position, said probe means being movable with said gauge means and engageable with said contour of said workpiece at selected test points thereon, optical reference and locating instrument means associated with said gauge means and located in a fixed dimensional reference relationship to said calibrated neutral position of said probe means, said instrument means being movable with said gauge means so as to be positioned in viewing relation with respect to the contour of said master profile means at reference points thereon corresponding to said selected test points, and means associated with said instrument means for optically referring and positioning said instrument means relative to said reference test points to locate said probe means in said fixed dimensional reference relationship relative to said reference test points so that dimensional variations in the contour of said workpiece at said selected test points thereon from said generally aligned relationship with said master profile means will be reflected by said gauge means in response to movement of said probe means relative to said calibrated neutral position thereof.

References Cited in the file of this patent
UNITED STATES PATENTS

| | | |
|---|---|---|
| 1,588,963 | Harter | June 15, 1926 |
| 2,883,905 | Crook et al. | Apr. 28, 1959 |

UNITED STATES PATENT OFFICE
CERTIFICATE OF CORRECTION

Patent No. 3,104,471                            September 24, 1963

Robert E. Skronek et al.

It is hereby certified that error appears in the above numbered patent requiring correction and that the said Letters Patent should read as corrected below.

Column 2, line 2, for "flexably" read -- fixably --.

Signed and sealed this 7th day of April 1964.

(SEAL)
Attest:

ERNEST W. SWIDER

Attesting Officer

EDWARD J. BRENNER

Commissioner of Patents